Nov. 6, 1945.  A. H. DAVIS, JR  2,388,256
APPARATUS FOR MEASURING RATE OF MOVEMENT
Filed July 30, 1942  2 Sheets-Sheet 1

INVENTOR.
BY  Archibald H. Davis, Jr.
Bruno C. Lechler

Nov. 6, 1945.     A. H. DAVIS, JR     2,388,256
APPARATUS FOR MEASURING RATE OF MOVEMENT
Filed July 30, 1942     2 Sheets-Sheet 2
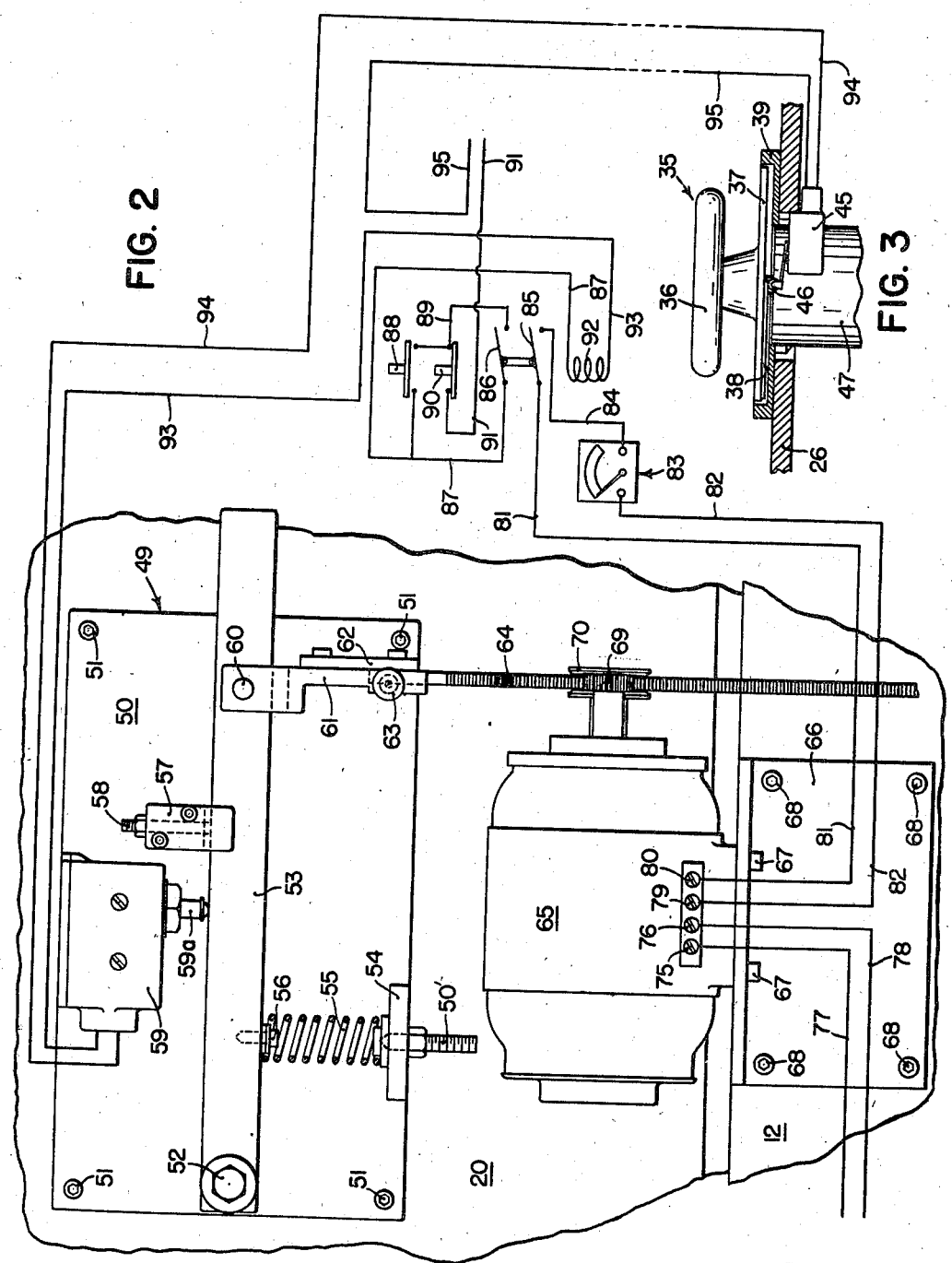
INVENTOR.
BY Archibald H. Davis, Jr.
Bruno C. Lechler Patented Nov. 6, 1945

2,388,256

UNITED STATES PATENT OFFICE 2,388,256

APPARATUS FOR MEASURING RATE OF MOVEMENT

Archibald H. Davis, Jr., Rock Island, Ill., assignor to American Machine and Metals, Inc., New York, N. Y., a corporation of Delaware Application July 30, 1942, Serial No. 452,951

6 Claims. (Cl. 73—90)

This invention relates to an apparatus for determining the rate of speed at which one body is moving relative to another. This apparatus is particularly well adapted to measure the rate of movement of a testing machine platen.

When a ram is moved at a uniform rate, as by controlling the feed of liquid to a cylinder containing the ram, this method and the apparatus constructed to practice the method, will give a precise indication of the actual rate of movement that permits correcting the setting of the liquid supply control to increase or decrease the rate of feed, thereby eliminating the effect of variations in the resistance the ram meets, the temperature change in the operating liquid or its viscosity.

While this invention is not limited to use in testing machines, a universal hydraulic testing machine will be used as an illustrative example of a machine whose speed is to be controlled at a precise and constant rate.

Such machines are adapted to strain a specimen either in tension, compression or flexure at a uniform rate.

This rate of strain may be as low as .050" per minute and it may be necessary, to get comparable results, that the variation in the rate be not over .005" per minute in successive tests. While the platen is to move at a uniform rate within such close limits, the resistance against which the platen moves may vary from 0 to 200,000#.

In my prior application, Serial No. 384,692, filed March 22, 1941, I have shown a hydraulic system adapted to move the plunger forward at a uniform rate determined by the setting of a valve. Although that valve may be calibrated so that a given opening represents a given rate of feed, that rate must vary from 0 to 12" per minute. It is not practicable to calibrate the setting of the valve fine enough to select any particular rate of feed within the sensitivity required in a testing machine, .005" per minute. Furthermore, variations in the viscosity and temperature of the operating liquid will give a somewhat different rate of movement for a given setting of the valve even if it has been carefully calibrated.

Furthermore, although it is possible to correct for viscosity and to change with temperature, when such a sensitivity is desired it would be difficult to take out all residual errors including possible strains on the machine frame itself that might affect the actual rate of movement of the platen.

The actual movement is so small that it cannot be measured sufficiently accurately by measuring the distance moved in a unit of time directly on the platen.

The novel method of determining the rate at which the platen is moving relative to the press head comprises setting the inlet valve for a uniform rate of movement approximately correct, then measuring the actual rate of movement with great precision by electrical magnification means, then slightly increasing or decreasing the rate of movement to secure the desired reading on the apparatus giving the actual rate of movement of the platen.

While the range of speeds of the platen when making tests may range from 0 to 2" per minute, the platen may move much faster—up to 12" per minute during adjustment to the specimen length and it may, upon rupture of a specimen, recoil sharply. It is not practicable to magnify the rate of platen motion over its entire speed range, therefore one function of the novel apparatus intended for use in the practice of the method is automatic protection against attempted magnification of rates of movement beyond the ranges within the capacity of the magnification device. Thus, either during recoil or when moving forward rapidly, or when moving in reverse, the magnification device is disconnected.

The sensitive indication of the rate of movement is secured by mounting a special low-speed generator and a rack meshing with the generator pinion, one on the platen and one on the frame of the machines, so that the current generated varies as the rate of motion of the platen. The current is measured by a micro-ammeter.

The apparatus designed for the practice of the method includes protection for the current-measuring equipment that cuts the holding circuit of a switch which maintains the current-measuring apparatus in circuit. If the platen speed increases to a value beyond the capacity of the measuring equipment, the switch is opened.

This switch is opened regardless of whether the speed is increased beyond the testing speed by the operator or by conditions beyond his control.

A cam is connected to the valve control so that whenever the valve control is set for an excessive forward rate of feed or for lowering of the plunger after a test the cam opens the holding circuit.

Attached to the platen is an inertia element that will not follow instantaneously if the platen suddenly accelerates. This normally bears on a micro switch that must be closed if the holding circuit is to be maintained. If the inertia element does not follow along with the platen, the circuit is broken momentarily and the current-measuring device is cut out of operation.

This inertia-responsive device may form the connection between the platen and the rack so that, when the specimen breaks, the generator will not revolve at the high speed of recoil. The inertia-responsive device may both cut the holding circuit as described and slow down the instantaneous speed change of the generator.

The object of my invention is to provide an apparatus for measuring the precise rate of speed of a ram moving at an imperceptible rate, the apparatus magnifying the rate of movement by driving a generator at a slow speed which varies with the speed of the ram and measuring the current so generated.

A further object is to provide apparatus that disconnects the sensitive current-measuring devices used in the method automatically if the speed passes beyond the speeds to be amplified.

A further object is to provide apparatus responsive to sudden speed changes not under the operator's control that disconnects the sensitive current-measuring devices used in the method.

A further object of the invention is to provide for disconnecting the rate of movement indicator during the sudden recoil of portions of the testing machine when a specimen is broken.

Figure 2 is an enlarged fragmentary side view of the testing machine in the plane 2—2 of Figure 1.

Figure 3 is an enlarged view, partly in section, of the hand wheel controlling the testing machine shown in Figure 1.

Figure 1:
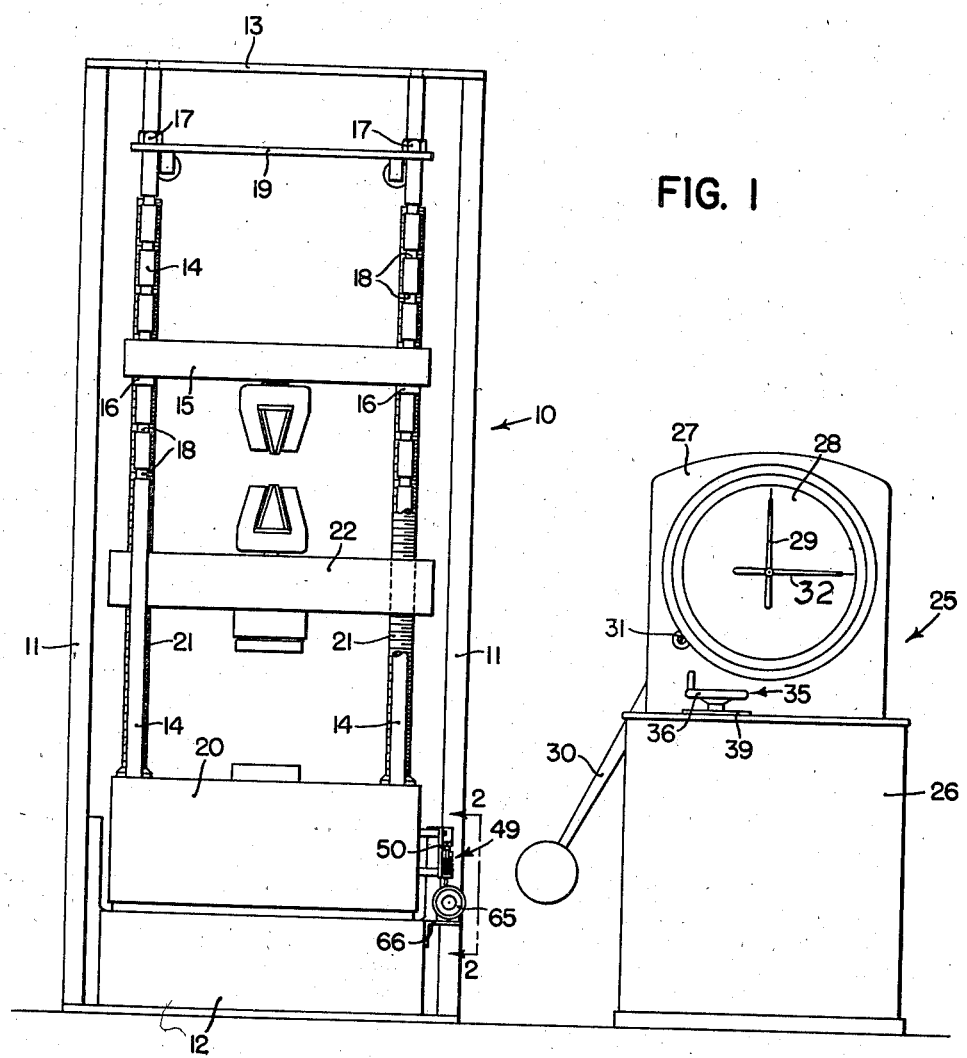
Figure 1 is an elevation of a typical hydraulic universal testing machine with its controlling unit, the testing machine equipped with the apparatus I prefer to use in the practice of my invention.

Referring to Figure 1, 12 is the base of the testing machine whose stationary side frames 11 carry a top plate 13. Vertical screws 21 supported in base 12 have cylindrical extensions that are guided in top plate 13 and permit adjusting the elevation of the stationary platen 22 prior to a test.

This is a conventional construction of a testing machine such as is currently on the market, for example the Riehle testing machine built by American Machine and Metals, Inc., of East Moline, Illinois.

A hydraulic cylinder, not shown, contained in base 12 has a ram that lifts a cage applying the force to the specimen. This cage consists of the lower platen 20, four bars 14 which carry the movable cross bar 15. To permit adjusting the machine for various lengths of specimens the bar 15 can be set at various fixed distances from the platen 20 by inserting split collars 16 in the appropriate notches 18 of bars 14.

Thus, when fluid is supplied to the ram, platen 20 lifts, carrying with it the bars 14, cross bar 15, and the cross plate 19 which is clamped to the ends of bars 14 by nuts 17. This cross plate 19 carries rollers permitting frictionless guidance on the extensions of the screws 21.

As the platen 20 and cross bar move upwards together, it is obvious that a compression test specimen may be inserted between platen 20 and stationary platen 22 or a tension specimen between that and cross bar 15.

The testing machine is controlled by a control cabinet 25 which contains a motor-driven hydraulic pump that supplies liquid under pressure to the cylinder contained in base 12 of the testing machine. It also contains means which measure pressure in the cylinder and these means cause a pendulum 30 pivoted at 31 to rise to an angle corresponding to the pressure in the machine. The position of the pendulum arm, determines the position of the indicator 29 on dial 28 on the upper part 27 of the control cabinet. The dial may have a maximum load indicating pointer 32 that is carried forward by the pointer 29 and left in a maximum load indicating position. The arrangement of the entire hydraulic operating system is shown in my application #384,692, filed March 22, 1941.

The hand valve 35 is mounted on the table top of the forwardly extended portion 26 of the cabinet 25. A flat disk 37 attached to valve stem 47 is graduated to indicate the setting of the valve against a mark on a rim 39. This construction will give a uniform rate of platen movement for any setting of valve 35.

When specimens are to be tested in compression they are placed between the upwardly movable platen 20 and the stationary platen 22. When they are to be tested in tension they are placed between the stationary platen 22 and the upwardly movable cross bar 15. Thus it will be seen that the load-applying platen 20 will always move in the same direction regardless of whether the test be of tension or compression, vertically away from the stationary base 12 regardless of whether the test be in tension or compression.

In the preferred embodiment of my invention as applied to a testing machine as described, 65 is a slow-speed D. C. generator. The field is excited by a constant voltage outside source connected to wires 77, 78.

The generator 65 is fastened to a bracket 66 by bolts 67. The bracket 66 in turn is attached to the base 12 of the testing machine by bolts 68. The motor is driven by rack 64 meshing with pinion 69 on the generator shaft. 70 is an idler that holds the rack against its pinion. If the line power voltage is not constant, the field current may be supplied by a small generator driven by an inductive type motor connected to the power line. Such a motor generator under the existing constant load conditions would have only a small speed variation.

If desired, the field of the low-voltage generator may be designed to operate above the magnetic saturation point. Then a change in the speed of the motor has an almost negligible effect on the current generated. As a result a variation in the line voltage or the frequency would have little effect on the strength of the current generated by generator 65 and would introduce no detectable error in the measurement based on the output of generator 65 at a given speed. Consequently, with uniform voltage supplied across the field terminals 75 and 76, the field strength of the slow-speed generator 65 is constant and practically independent of the line voltage. Under these conditions the voltage produced by the low-speed generator 65 is proportional to the speed at which the low-speed generator is turned.

The current flowing through a constant resistance circuit, measured by micro-ammeter 83, is proportional to the voltage generated.

The driving rack 64 may be connected to movable platen 20 by the device generally indicated at 49.

The driving rack 64 is pivotally connected by a clevis 61 to an inertia beam 53 at 60. A removable pin 63 is interposed between the rack and the inertia beam to permit disconecting the device when platen speed is not to be measured.

This inertia beam 53 is pivotally connected at 52 to plate 50. Plate 50 is fastened by screw bolts 51 to the movable ram platen 20 for the testing machine. The spring 55, one end of which is supported by the extension 54 of plate 50 and the other end of which is bearing against the beam at 56 is adjustable by a screw 50' to slightly overbalance the beam 53. This beam thereby is held against the stop 57 which carries adjustment screw 58. The adjustment is made so that the beam just closes switch 59 by pushing inward switch button 59A when resting against the stop. The switch is also carried by plate 50.

Normally when making a test, platen 20 will move upwards at a constant rate of speed and with it the closed switch 59 and the inertia beam which will continue to abut against the switch button 59A under action of spring 55, moving the rack 64 upwards. Thereby the generator 65 is turned at a rate of speed corresponding to that of the platen and will generate a voltage proportional to that rate of speed.

If the rate of speed of the platen 20 should increase suddenly as for example if the specimen is ruptured, the beam 53, due to its inertia, will follow this movement only after a short interval, and during this interval lose contact with the switch 59A, thereby opening switch 59 and compressing spring 55. Spring 55 thereafter causes the beam to follow the movement and to again abut against button 59A and stop 57. The purpose of this inertia device will be described hereafter in connection with the magnifying device.

The current produced by the generator 65 which, as explained before, is proportional to the rate of motion of the ram of the testing machine, passes to a sensitive micro-ammeter 83. A relay switch 85 is connected in this circuit permitting this circuit to be operative only when the relay coil 92 is energized. The scale of the ammeter may be calibrated in units of rate of motion as for instance in inches per second. Its full scale range corresponds to only a part of the range for which the control valve 35 may be set.

To make the ammeter operative only for that part of the range of platen rate of motion which corresponds to the scale range of setting of the control valve 35 that is to be magnified, control valve 35 carries a cam 38 attached to the under side of disk 37. The elevated part of this cam covers the range of setting of the control valve for which the platen speed is to be read on the scale of the ammeter. This cam contacts with arm 46 of switch 45 and closes this switch only when the valve setting is within the range of the ammeter. Therefore part only of the range of the valve setting will be indicated in magnification on the ammeter. Switch 45 is connected in the circuit of relay coil 92 so that this relay can only be energized to close the ammeter circuit by closing of switch 85 when switch 45 is closed.

It will be seen that by this arrangement the magnification of the readings of a part only of the range of setting of the control valve is obtained and furthermore the ammeter is protected against damage should the rate of motion of the testing machine selected exceed the scale range of the ammeter as for instance if the operator sets the control valve for a quick retrograde motion of the plunger of the testing machine after a test.

When the magnification is to be used, the operator pushes button 88. Relay coil 92 closes switches 85, 86, thereby closing the ammeter circuit and also establishing a holding circuit for coil 92 through line 89, contact 86, line 87, that permits releasing the finger from start button 88. This circuit also passes, as described before, through the two switches 59 and 45. This circuit will remain energized as long as neither of three switches is opened, one by an excessive rate of motion, one by pushing the stop button 90, one by selecting a high rate of feed. Once coil 92 is de-energized, it can only be re-energized by again pushing the start button and if at the same time the rate of motion of the platen is not excessive, the micro-ammeter goes into use. If either one of the switches 45 or 59 is open the micro-ammeter does not indicate.

To further avoid damage to the ammeter due to a sudden increased rate of motion exceeding the range of the ammeter, switch 59 which is operated by the inertia beam 53 as described before is also connected in a series with switch 45 and relay coil 92. As already stated before, switch 59 is opened when there is a sudden increase of the rate of motion of the platen as when the inertia beam 53 lags behind the movement of the platen. Thus at any excessive rate of motion either switch 59 or switch 45 opens, de-energizing relay coil 92, whereby switch 85 opens and interrupts the ammeter circuit.

What I claim is:

1. An apparatus for measuring the rate of movement of a body which includes, in combination, a stop on the body, an element movably supported on the body, an abutment on the body, spring means acting between the abutment and the element tending to move the element against the stop in the direction of motion of the body, a rack, a generator, a pinion on the generator shaft in mesh with the rack, the generator and the rack respectively connected to a fixed point and the element, means for measuring the current produced by the generator, the current so produced being the measure of the speed of the body except during a forward lurch when the inertia of the element overcomes the spring and the element ceases to move with the body.

2. In a testing machine having means for moving a platen in a housing, in combination, a movable platen, a controller permitting a choice of platen speeds including speeds not adapted to the strain-testing of specimens, controlling said movable platen, means connected to the platen for generating a current by the movement of the platen, means connected in circuit with said current generating means adapted to utilize a characteristic of the current so generated to measure the speed of the platen, means comprising two switch in series in said circuit adapted to interrupt the flow of said current to said measuring means, one of said switches being actuated by the controller when a speed not adapted to strain testing is selected, the other switch being carried by the platen, inertia means responsive to acceleration above a preset rate carried by the platen and adapted to actuate the last-named switch.

3. In combination, an apparatus having a movable part means for generating current by the movement of said part, a circuit for said current, means in said circuit utilizing a characteristic of the current generated to measure the speed of the part, means carried by the part adapted to interrupt the circuit when the speed of the part increases faster than a preset rate, said means comprising a pivot on the part extending normal to the direction of its motion, a lever supported on said pivot also extending substantially normal to the direction of motion of the part, a spring carried by the part tending to move the lever in the direction of motion of the part, a switch carried by the part and engaged by said lever maintaining said circuit at all times except when the acceleration of the part exceeds a preset rate causing the inertia of the lever to overcome said spring and actuate said switch to interrupt the circuit.

4. In a testing machine having a platen movable in a base and means for moving the platen, in combination, a base, a platen movable relative to the base, manually operated means for controlling the speed of the platen some speeds not being suitable for strain-testing, a generator carried by the base, means for measuring a characteristic of the current generated included in a circuit connected to said generator, a relay in said circuit, a second circuit adapted to close said relay, means effective when the speed of the platen increases faster than a preset amount to interrupt said second circuit comprising, a pivot on the platen extending normal to the direction of its motion, a lever supported on said pivot also extending substantially normal to the direction of motion of the platen, a spring tending to move the lever in the direction of motion of the platen against a stop on the platen that limits the movement of the lever, a switch in said second circuit mounted on the platen held closed by the lever except when the lever is moved by its inertia away from the stop overcoming the spring, a rack connected to the lever, a pinion on the generator meshing with the rack whereby the motion of the platen drives the generator.

5. In a testing machine, in combination, a base, a platen movable relative to the base, means for moving the platen, a speed controller permitting a choice of platen speeds inclusive of high speeds not adapted to the strain testing of specimens between the platen and the base, means comprising an electric generator carried by the base adapted to be excited by an external source and means connected with the platen to turn the generator armature so that the number of its revolutions is proportional to the distance traveled by the platen, micro-ammeter means in the generator circuit to indicate the speed of the platen during a strain test, means to protect the micro-ammeter against overload at non-testing speeds which include a switch automatically interrupting said circuit when the controller is set for a high speed not designed for testing specimens.

6. In combination, an apparatus having two relatively movable parts, an electric generator connected to one part, means connecting the other part and the armature of said generator in a manner to turn said armature as the two parts move relative to each other, means for measuring the current generated, means adapted to prevent the generation of current when the speed of the parts changes abruptly, said means comprising a mass movably supported on one part, a switch in series with the measuring means, resilient means normally holding said mass in a position to engage said switch to permit the flow of current from the generator to the measuring means, said resilient means being overcome by the inertia of the mass during the abrupt acceleration of recoil, thereby interrupting the circuit containing the measuring means.

ARCHIBALD H. DAVIS, Jr.